(12) United States Patent
Jauss et al.

(10) Patent No.: US 12,518,015 B2
(45) Date of Patent: *Jan. 6, 2026

(54) MITIGATION OF A MANIPULATION OF SOFTWARE OF A VEHICLE

(71) Applicant: Robert Bosch GmbH, Stuttgart (DE)

(72) Inventors: Manuel Jauss, Wissgoldingen (DE); Felix Hallaczek, Stuttgart (DE); Marcel Kneib, Ingelheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 272 days.

This patent is subject to a terminal disclaimer.

(21) Appl. No.: 18/165,649

(22) Filed: Feb. 7, 2023

(65) Prior Publication Data

US 2023/0267212 A1 Aug. 24, 2023

(30) Foreign Application Priority Data

Feb. 23, 2022 (DE) ..................... 10 2022 201 901.6

(51) Int. Cl.
*G06F 21/57* (2013.01)
(52) U.S. Cl.
CPC ........ *G06F 21/57* (2013.01); *G06F 2221/033* (2013.01)
(58) Field of Classification Search
CPC .. G06F 21/57; G06F 2221/033; G06F 21/575; G06F 9/445; B60W 50/06;

(Continued)

(56) References Cited

U.S. PATENT DOCUMENTS

2002/0166059 A1* 11/2002 Rickey ................. G06F 21/575
726/24
2004/0225892 A1* 11/2004 Bear ..................... G06F 21/575
726/20

(Continued)

FOREIGN PATENT DOCUMENTS

CN 113742717 A * 12/2021 ......... H04L 63/0435
DE 102018006368 A1 * 2/2019 .......... G06F 21/552

(Continued)

*Primary Examiner* — John B King
(74) *Attorney, Agent, or Firm* — NORTON ROSE FULBRIGHT US LLP (57) ABSTRACT

A computer-implemented method for detecting the possibility of a manipulation of the software of a first component of a multiplicity of components of an onboard network of a vehicle in a central device for mitigating a manipulation of software. The central device for mitigating a manipulation is part of the onboard network and configured for the mitigation of software in each of the multiplicity of components of the onboard network. The method includes the initiation of a countermeasure for mitigating the manipulation of the software of the first component by the central device for mitigating a manipulation and the implementation of the countermeasure for mitigating the manipulation of the software of the first component. The countermeasure against the manipulation includes resetting the software of the first component using a security module of the first component and/or an unalterable module of the first component.

14 Claims, 5 Drawing Sheets

(58) Field of Classification Search
CPC .............. B60W 50/00; B60W 50/045; B60W 2050/0043; B60W 2050/065; B60R 16/023
See application file for complete search history.

(56) References Cited

U.S. PATENT DOCUMENTS

| | | | | |
|---|---|---|---|---|
| 2007/0006320 A1* | 1/2007 | Paul | ............ | G06F 21/57 726/27 |
| 2007/0073978 A1* | 3/2007 | Lee | ............ | G06F 11/1417 714/E11.135 |
| 2007/0226694 A1* | 9/2007 | Neufeld | ............ | G06F 21/57 717/126 |
| 2013/0111212 A1* | 5/2013 | Baltes | ............ | G06F 21/64 713/176 |
| 2016/0011932 A1* | 1/2016 | Abo El-Fotouh | ... | G06F 11/0739 714/15 |
| 2017/0118023 A1* | 4/2017 | Gussen | ............ | G06F 21/6218 |
| 2020/0364329 A1* | 11/2020 | Boulton | ............ | G06F 21/562 |
| 2023/0015692 A1* | 1/2023 | Wiemer | ............ | G06F 21/51 |
| 2023/0024817 A1* | 1/2023 | Hallaczek | ............ | G06F 21/52 |
| 2023/0091293 A1* | 3/2023 | Duplys | ............ | G06F 11/302 726/25 |
| 2023/0267204 A1* | 8/2023 | Jauss | ............ | G06F 21/554 726/23 |
| 2023/0267205 A1* | 8/2023 | Kneib | ............ | G06F 21/554 726/23 |
| 2023/0267206 A1* | 8/2023 | Hallaczek | ............ | G06F 21/57 726/23 |
| 2023/0267213 A1* | 8/2023 | Nobbe | ............ | G06F 21/554 726/23 |
| 2024/0036878 A1* | 2/2024 | Pandit | ............ | G06F 21/575 |

FOREIGN PATENT DOCUMENTS

| | | | | |
|---|---|---|---|---|
| EP | 3291119 B1 | * | 5/2020 | ............ G06F 21/554 |
| JP | 2024540573 A | * | 10/2024 | ............ G06F 21/566 |
| WO | WO-2020133005 A1 | * | 7/2020 | ............ G05D 1/02 |

* cited by examiner

MITIGATION OF A MANIPULATION OF SOFTWARE OF A VEHICLE

CROSS REFERENCE

The present application claims the benefit under 35 U.S.C. § 119 of German Patent Application No. DE 10 2022 201 901.6 filed on Feb. 23, 2022, which is expressly incorporated herein by reference in its entirety.

BACKGROUND INFORMATION

In the recent past, vehicles are increasingly being integrated into open contexts (that is, the vehicles have one or more interfaces by way of which data are received and/or transmitted while the vehicle is in operation, the data in turn being used to operate the vehicle). In addition, the complexity of the components of the vehicle and especially their software is steadily growing. The software of the vehicles is furthermore updated in ever more varied ways during an operation.

This results in more diverse possibilities for manipulating the software of the components of the vehicles.

In some methods of the related art, the detection and especially the mitigation of manipulations (that is, the correction in order to achieve a defined (safe) state) requires a considerable effort and consequently entails time delays. For example, the manipulated software of a component (such as a control unit) can be reset within the framework of a visit to a repair workshop and the manipulation thus be corrected. In other techniques, the software may be requested by a remote computer system with whose aid the manipulated software of a component (e.g., a control device) is reset and the manipulation therefore remedied. In both cases, a considerable time interval may lie between the detection of the manipulation and the mitigation of the manipulation. The operation of the vehicle may possibly be interrupted during this time interval (e.g., a predefined safety criterion no longer be satisfied). In some cases, the vehicle can no longer be driven, or its functionality could be severely disrupted. Improved techniques for mitigating the manipulation of software are therefore desirable.

SUMMARY

A first general aspect of the present invention relates to a computer-implemented method. According to an example embodiment of the present invention, the method includes detecting the possibility of a manipulation of the software of a first component of a multiplicity of components of an onboard network of a vehicle in a central device for mitigating a manipulation of software. The central device for mitigating a manipulation is part of the onboard network and configured for the mitigation of software in each one of the multiplicity of components of the onboard network. The method furthermore includes the initiation of a countermeasure for mitigating the manipulation of the software of the first component by the central device for mitigating a manipulation, and the implementation of the countermeasure for mitigating the manipulation of the software of the first component. The countermeasure for the manipulation includes resetting the software of the first component with the aid of a security module of the first component and/or an unalterable module of the first component.

A second general aspect of the present invention relates to a system which is designed to carry out the method according to the first general aspect of the present invention.

A third general aspect of the present invention relates to an onboard network for a vehicle. According to an example embodiment of the present invention, the onboard network includes a multiplicity of components, including a first component and a central device for mitigating a manipulation of software. The onboard network is designed to carry out the method according to the first general aspect of the present invention.

A fourth general aspect of the present invention relates to a vehicle which includes the system according to the second general aspect and/or is part thereof and/or includes the onboard network according to the third general aspect of the present invention.

In some cases, the techniques of the first to fourth general aspects of the present invention may have one or more of the following advantages.

First of all, it may be possible in some situations to achieve a secure reset of a manipulated software of a component (e.g., a replacement with a non-manipulated software component). In some cases, the use of a security module and/or an unalterable module of the first component during the rest may ensure that an intruder will be unable to (also) compromise the reset process. In some cases, the techniques of the present invention may achieve this by using a module in the reset process that is less easily (and ideally, not at all) able to be compromised by an intruder. This characteristic may be offered both by a security module and an unalterable module. Compared to the other modules of the first component, the security module (e.g., a hardware security module, HSM) may have additional security devices and thus be more difficult to manipulate than the other modules. An unalterable module may essentially disallow any changes to its software and/or functionality during an operation. This, too, makes a manipulation of this module more difficult and may make it impossible in the ideal case. The modules are able to be used in different ways in the reset process; for instance, they can switch the component to a reset mode that allows for a reset of the software. In addition or as an alternative, they may accept a software component for a reset. In all cases, the respective process can be secured against a manipulation.

Secondly (and as a consequence of the first advantage), the techniques of the present invention may in some instances allow for the secure use of a central device for mitigating a manipulation of software. In comparison with some techniques from the related art, a system equipped with a central device for mitigating a manipulation of software may be scaled more easily and/or be used in older vehicles (not configured according to the latest standard). For instance, the central device for mitigating a manipulation is relatively easy to modify to 'support' additional components. In some cases, the 'supported' components require little or no modifications at all for this purpose, which makes it easier to use them in older vehicles. Even the central device for mitigating a manipulation itself can be retrofitted by a software update in some cases. For instance, an existing component of a vehicle (such as a central communication interface of the vehicle or a central computer of the vehicle) is able to be provided with the (additional) function of a central device for mitigating a manipulation with the aid of a software update.

Some terms in the present disclosure are used in the following way:

A 'component' (of an onboard network) in the present disclosure has its own hardware resources, which include at least a processor for executing instructions, and a memory for storing at least one software component. The term 'processor' also encompasses multi-core processors or multiple separate components that assume (and possibly share) the tasks of a central processing unit of an electronic device. A component is able to perform tasks independently (e.g., measuring tasks, monitoring tasks, control tasks, communication tasks and/or other work tasks). In some examples, however, a component may also be controlled by some other component. A component may be physically separated (e.g., by its own housing) or else be integrated into a higher-level system. A component can be a control device or a communication device of the vehicle. A component may be an embedded system. A component may include one or more microcontrollers.

An "embedded system" is a component which is incorporated into (embedded in) a technical context. The component then assumes measuring tasks, monitoring tasks, control tasks, communication tasks and/or other work tasks.

A "(dedicated) control device" is a component which (exclusively) controls a function of a vehicle. For instance, a control device may assume an engine control, a control of a brake system, or a control of an assistance system. A "function" may be defined at different levels of the vehicle (e.g., can be used for a function of an individual sensor or actuator but also for a multitude of subassemblies which are combined to form a larger functional unit).

The term "software" or "software component" may basically relate to any part of a software of a component (such as a control device) of the present disclosure. More specifically, a software component may be a firmware component of a component of the present disclosure. "Firmware" is a software that is embedded in (electronic) components, where it performs basic functions. Firmware is functionally permanently connected to the respective hardware of the component (so that one is unable to be used without the other). It may be stored in a non-volatile memory such as a flash memory or an EEPROM.

The term "update information" or "software update information" includes all data that form a software component of a component according to the present invention, either directly or after corresponding processing steps. The update information may include executable code or code still to be compiled (which is stored in the memory of the corresponding component).

The term "manipulation" in the present invention encompasses any modification of a software of a component of a vehicle. The modification may be the consequence of an attack (that is, a deliberate influence by a third party) or else also be the consequence of a random or unintentional action.

The term "vehicle" includes all devices that transport passengers and/or freight. A vehicle may be a motor vehicle (such as a passenger car or a truck) but also a rail vehicle. Floating and flying devices may also be vehicles, however. Vehicles may be operating at least semi-autonomously or feature assisted driving.

An "onboard network" can be any internal network of a vehicle by way of which components of the vehicle communicate. In some examples, an onboard network is a near-field network. An onboard network may use one or more near-field communication protocols (such as two or more near-field communication protocols). The near-field communication protocols can be wireless or wire-bound communication protocols. The near-field communication protocols may include a bus protocol (such as CAN, LIN, MOST, FlexRay or Ethernet). The near-field communication protocols may include a Bluetooth protocol (e.g., Bluetooth 5 or later) or a WLAN protocol (such as a protocol of the IEEE-802.11 family, e.g., 802.11h or a later protocol). An onboard network can include interfaces for a communication with systems outside the vehicle and thus may also be incorporated into other networks. However, the systems outside the vehicle and the other networks are not part of the onboard network.

The expression "detecting a possibility . . . " means that certain events (e.g., signals or their absence) are interpreted according to predefined rules for detecting a state in which a manipulation of the software may have occurred.

DETAILED DESCRIPTION OF EXAMPLE EMBODIMENTS

At the outset, a vehicle and a component in which the techniques of the present invention can be carried out as well as the basic aspects of the techniques of the present invention will be discussed with reference to FIG. 1 to FIG. 3. One example of the technique of the present invention is described with reference to FIG. 4. Additional aspects of the central device for mitigating software are described on the basis of FIG. 5 and FIG. 6.

Figure 1:
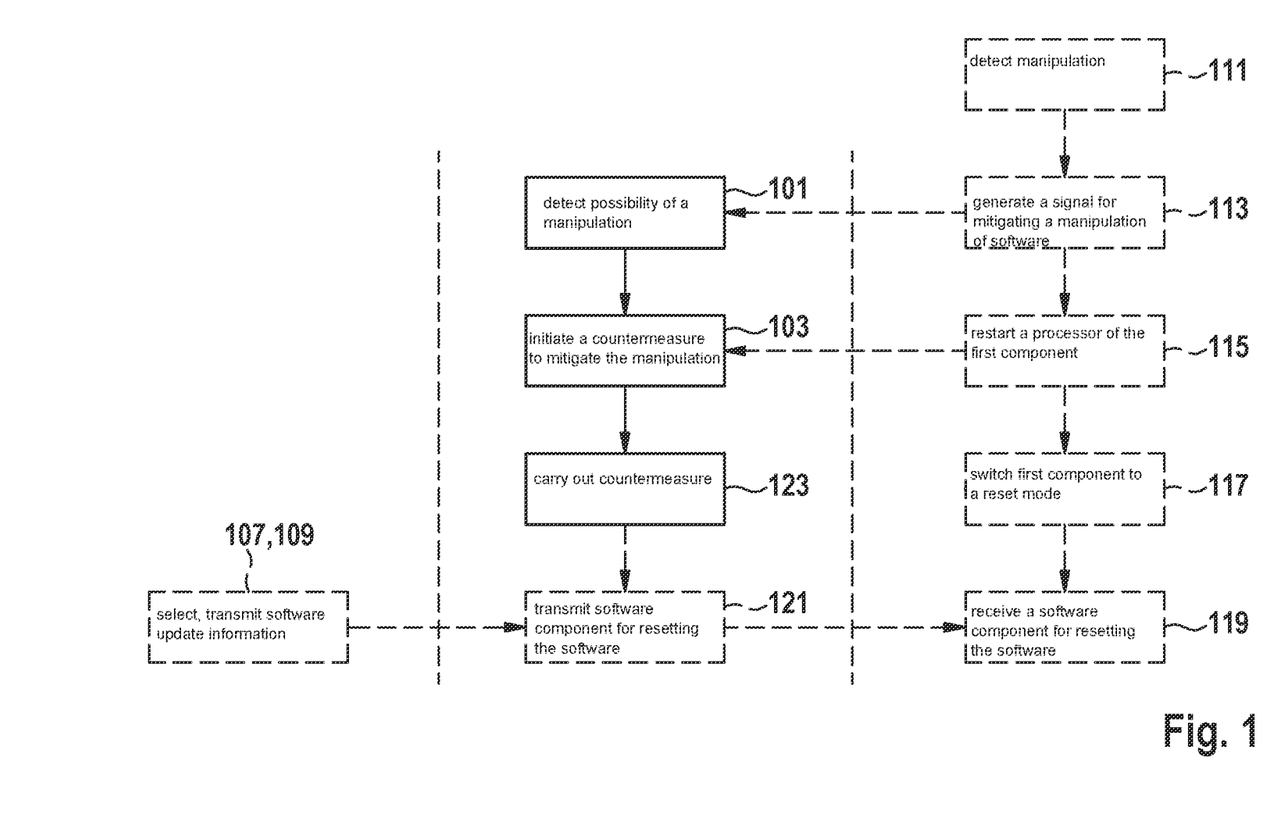
FIG. 1 is a flow diagram which illustrates the techniques of an example embodiment of the present invention.

FIG. 1 is a flow diagram which illustrates the techniques of the present invention. FIG. 2 shows components of an onboard network of a vehicle in which the techniques of the present invention are able to be used. FIG. 3 shows an exemplary component of an onboard network.

The center column of FIG. 1 illustrates steps that are carried out by a central device for mitigating a manipulation of software. The right column shows steps which are carried out by a certain component (or a group of components) of the onboard network (exclusive of the central device for mitigating a manipulation of software). The left column shows steps which are carried out by a remote system (that is, outside the vehicle).

The techniques of the present invention include detecting 101 the possibility of a manipulation of the software of a first component 27*c* of a multiplicity of components of an onboard network of a vehicle 20. A vehicle 20 is schematically shown in FIG. 2. The vehicle is equipped with an onboard network, which connects a multiplicity of components 21-24, 25, 27*a-f* of vehicle 20 (the onboard network may be developed as described above).

Vehicle 20 is equipped with a central device for mitigating a manipulation of software 25, which detects the possibility of the manipulation. It is therefore part of the onboard network (that is, also part of the vehicle and moved by this vehicle). The central device for mitigating a manipulation of software 25 is designed to mitigate the manipulation of software in each one of the multiplicity 21-24, 27*a-f* of components of the onboard network.

In some examples, the central device for mitigating a manipulation of software 25 is integrated into a central communication interface of vehicle 20. The central communication interface may be designed to function as a data distributor for the communication inside vehicle 20 and/or via a communication interface 21, 22 with the external world. The central communication interface is able to support different communication protocols (for the communication within the onboard network or with external systems) and/or implement security functions. In other examples, the central device for mitigating a manipulation of software may be integrated into other components (further examples follow below) or be configured as an independent component.

In some examples, the detecting may include receiving a signal that indicates a manipulation of the software of a first component of a multiplicity of components of an onboard network of a vehicle 20. The signal is able to be generated in the central device for mitigating a manipulation of software 25 itself and/or in some other device.

In addition or as an alternative, the detecting may include the detection of an absence of an (expected) signal (e.g., from the first component or a component that monitors the first component). The onboard network may be designed in such a way that the multiplicity of components 21-24, 25, 27a-f or other components transmit signals which indicate that no manipulation of the software of the respective component of the multiplicity of components 21-24, 25, 27a-f has occurred (e.g., on a regular basis or in response to the occurrence of certain events such as the startup of a component).

In addition or as an alternative, the detecting may furthermore include the processing of other state information of the onboard network in order to detect the possibility of a manipulation of the software of the first component.

In response to the detection of the possibility of a manipulation of the software of a first component of a multiplicity of components of an onboard network of a vehicle 20 (e.g., the receiving of a signal or the detecting of a missing signal), the central device for mitigating a manipulation of software 25 initiates 103 a countermeasure to mitigate the manipulation of the first component. The countermeasure for mitigating the manipulation of the first component will then be carried out 123.

The countermeasure against the manipulation includes resetting the software of a first component 27c for which the possibility of a manipulation was detected. The resetting of the software of first component 27c is implemented with the aid of a security module of first component 27c and/or an unalterable module of first component 27c. The security module and the unalterable module will be described in greater detail later in the text in connection with FIG. 3. In some examples, it is possible to use only a security module or use only an unalterable module for the resetting. In other examples, both a security module and an unalterable module may be used for the resetting (in some examples, however, a security module may also be an unalterable module). The initiating can include a message and/or an instruction of the central device for mitigating a manipulation of software 25 to the security module or the unalterable module. After the message and/or instruction has/have been received, the security module or the unalterable module may carry out the corresponding steps. As an alternative, the initiating may also mean that the central device for mitigating a manipulation of software 25 refrains from sending a message (e.g., a type of message that is regularly sent by the central device for mitigating a manipulation of software 25 as long as no possibility of a manipulation is detected).

The resetting may include multiple steps, of which one or more is/are carried out using the security module and/or the unalterable module. The use of the respective module may include orchestrating the resetting or one of its steps (e.g., the transmission of instructions to other modules of the first component to carry out one or more steps of the resetting). As an alternative or in addition, the use may include transmitting and/or receiving data within the scope of the reset.

In some examples, the resetting of the software may include restarting 115 a processor of the first component (the processor is the central processing unit of the component). In some examples, the restarting 115 may include shutting down and subsequently restarting the processor. In addition or as an alternative, the restarting may include a shutdown and subsequent restart of the processor (for instance by interrupting and reconnecting the supply voltage of the processor). In other examples, however, a restart could also include resetting the processor to a certain configuration and/or resetting certain parts of the processor (e.g., its registers). In some examples, a program of the component may start anew from the beginning after a restart.

The restart is able to be initiated in different ways.

In some examples, the security module may initiate the restart. For instance, the security module is able to force a restart of the processor of first component 27c. The security module may be specifically configured for this purpose. In other examples, security modules may already be equipped with this functionality (in order to initiate a restart under different circumstances).

As an alternative or in addition, the restarting of the processor of first component 27c can be initiated by a current-supply unit of vehicle 20. In some examples, the current supply unit is designed to selectively supply the multiplicity of components 27a-f of the onboard network (or groups thereof) with energy. For example, the current supply unit is able to selectively turn off or shut down the multiplicity of components 27a-f of the onboard network (or groups thereof).

In addition, the restarting of the processor of first component 27c may alternatively or additionally be initiated by actuating a central activation function of the vehicle (such as an ignition or some other central activation function of vehicle 20).

In all the afore-described cases, the restart is able to be initiated without using parts of first component 27c that are possibly compromised by the manipulation. This can reduce the likelihood that an intruder interferes with the reset process.

In some examples, the resetting includes switching 117 first component 27c to a reset mode (e.g., after the restart 115 or during the restart 115) with the aid of a security module of first component 27c and/or an unalterable module of first component 27c. The reset mode may enable a subsequent resetting of the software. The reset mode, for instance, may be a programming mode of first component 27c in which the software of first component 27c is able to be modified (whereas this is not possible in an operating mode).

In some examples, the resetting includes receiving 119 a software component for resetting the software of first component 27c (e.g., after first component 27c has been switched to a reset mode) and storing the received software component in a memory of first component 27c. This makes it possible to replace a manipulated software component (and to remedy the manipulation). The manipulated software component may be part of the software of the first component. As an alternative or in addition, the received software component may include configuration information for resetting the software of first component 27c. With the aid of the configuration information, it is possible to modify a configuration of the software of first component 27c. The software component for resetting the software is able to be transmitted (121) by the central device for mitigating a manipulation 25 (for instance with the aid of the techniques described later in the text).

As described further below, a software component for resetting the software of first component 27c may be stored in the vehicle in some examples, for instance as part of a software bundle or software container 31 which includes software update information for a multiplicity of components (for instance stored in a persistent memory 41 of the central device for mitigating a manipulation 25). In these examples (but also in general), the software component for resetting the software of the first component 27c is able to be verified prior to the reset. This may be accomplished in different ways (which can also be combined). In some examples, the software component for resetting the software of first component 27c is able to be authenticated. For instance, one or more reference authentication element(s) may be assigned to the software component for resetting the software of first component 27c (the one or more reference authentication element(s) may be stored in a list, e.g., in first component 27c or some other memory of the vehicle, possibly together with corresponding reference authentication elements for other software components for resetting the software of other components of the vehicle). In some examples, the one or more reference authentication element(s) is/are determined in the vehicle (and stored in a list, for instance) when the software component for resetting the software of first component 27c, e.g., the software bundle or software container 31, is received. These reference authentication elements are then available for a later comparison in order to verify a software component. To verify the software component for resetting the software of first component 27c (or some other software component), a corresponding reference authentication element is able to be compared, prior to the resetting, to an authentication element, which is ascertained for the software component stored in the vehicle for resetting the software of first component 27c. If the software component for resetting the software of first component 27c stored in the vehicle is authenticated based on the comparison (e.g., the reference authentication element matches the ascertained authentication element), the software component can be used to reset the software of first component 27c. If the software component for resetting the software of first component 27c stored in the vehicle is not authenticated based on the comparison (e.g., the reference authentication element does not match the ascertained authentication element), then the reset process is able to be aborted. The reference authentication elements (and therefore the corresponding ascertained authentication elements) can have different developments. In some examples, the (reference) authentication element may be a hash value (the hash value being ascertained for an authentic software component for resetting the software of first component 27c and being stored in the vehicle as a reference authentication element). In still other examples, the (reference) authentication element may be a digital signature (the digital signature being received for an authentic software component for resetting the software of first component 27c and being stored in the vehicle as a reference authentication element). In still other examples, the reference authentication element may be a MAC element (message authentication code), the MAC element being received for an authentic software component for resetting the software of first component 27c and stored in the vehicle as a reference authentication element). In some situations, a verification of the software component for resetting the software of first component 27c may prevent that a software component stored in the vehicle and manipulated by an intruder after being received in the vehicle is used for resetting first component 27c. Without the verification, in cases in which the software components used for resetting the software are stored in the vehicle (e.g., for a longer period of time such as longer than one day), this stored software component or these stored software components could be locally manipulated in the vehicle and then used for resetting the component.

In some examples, the receiving of the software component for resetting the software and storing of the received software component is able to be carried out by the security module. As an alternative or in addition, the receiving of the software component for resetting the software and storing the received software component can be carried out by the unalterable module.

In some cases, as mentioned, the software component may be a firmware component. In both cases, parts of first component 27c possibly compromised by the manipulation are once again circumvented. In both cases it may thus be more difficult for an intruder to prevent the resetting process of the software and/or to introduce manipulated software again.

With regard to FIG. 3, aspects of first component 27c will now be described in greater detail (the other components of the present invention may also have the described development). First component 27c has a memory 91. Memory 91, for instance, may be a non-volatile memory (e.g., an EPROM or a flash memory). Memory 91 may be configured to store at least one software component for first component 27c (e.g., for controlling first component 27c), such as within the scope of the reset as described above. Memory 91 can be a program memory of first component 27c. Memory 91 may include only part of the total memory of first component 27c. As an alternative or in addition, memory 91 is able to be distributed across multiple hardware modules and/or logic segments.

First component 27c may include a security module 93. Security module 93 can be separate from the remaining modules of first component 27c in terms of its hardware and software (e.g., be a separate physical module or an independent periphery module). The security module may include one or more processor(s) of its own (e.g., at least one crypto accelerator). In other examples, security module 93 may encompass one or more core(s) of a multi-core processor or other elements of a higher-level component (which are statically or dynamically assigned to the security module; for example, one or more core(s) of a multi-core processor may be configured as the security module). In this case, too, the security module (e.g., one or more cores of the multi-core processor) are separated from the other elements (for instance, the switching circuits are physically separated). In some examples, security module 93 may be designed to perform one or more cryptographic functions to cryptographically secure the communication with the central device for mitigating a manipulation of software 25 (e.g., the cryptographic functions described earlier in the text). In some examples, as described above, security module 93 is able to be used in the reset process of first component 27c. In addition or as an alternative, security module 93 of first component 27c may be designed to detect the possibility of a manipulation (e.g., have a detection device 81a as described in the further text).

In some examples, security module 93 is a hardware security module (HSM). In the example of FIG. 3, security module 93 is an internal security module of component 27c. In other examples, the security module may be an external security module for component 27c (which, for instance, is included by another component of vehicle 20 such as by a central device for mitigating a manipulation of software 25).

The first component may furthermore include an unalterable module 99. As mentioned, unalterable module 99 (or its software and/or functionality) may not tolerate any changes in a normal operation of first component 27c. In some examples, unalterable module 99 includes a boot loader, which is designed to execute a (minimal) program for starting the first component. In some examples, unalterable module 99 can include a non-volatile memory or a memory featuring a write protection. As described above, unalterable module 99 may be used in the reset process of first component 27c in some examples.

In addition, component 27c also has a processor 94 for executing instructions. As mentioned above, the term 'processor' also includes multi-core processors or multiple separate components which assume the tasks of a central processing unit of the component (and possibly share them). In some examples, component 27c may include one or more interface(s) 95, which is/are designed for the communication via a transmission path 96 of the onboard network. As may be gathered from FIG. 3, processor 94, security module 93 or both have direct access to the one or the multiple interfaces 95 in order to communicate via transmission path 96 of the onboard network. The transmission path may be a transmission path of a bus system (e.g., CAN, LIN, MOST, FlexRay or Ethernet). A direct access of security module 93 to the one or more interface(s) 95 makes it possible for the security module to (securely) receive software components for the resetting process (without an interconnection of possibly compromised modules of the first component).

Based on FIG. 4, an exemplary sequence of a method of the present invention will be described in the following text.

Figure 4:
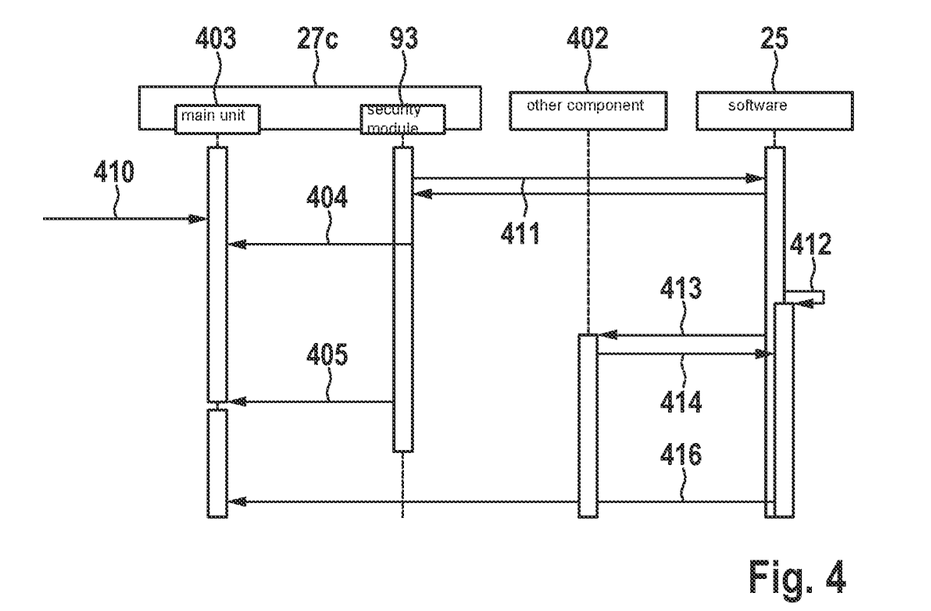
FIG. 4 shows a flow diagram of an exemplary method of the present invention.

In FIG. 4, the actions of a specific component (or one of its modules) or system are shown in each column. Arrows between the columns symbolize a communication between the respective units. All the way to the left, a specific component (first component 27c of the present invention) is shown (for instance an embedded system of vehicle 20 such as a control unit). Component 27c may have two modules, a main unit 403 (which can include a processor 94, for example), and a security module 93. Main unit 403 may be designed to provide a functionality of the component in the vehicle (such as measuring tasks, monitoring tasks, control tasks, communication tasks, and/or other work tasks). One of the other components 402 of the onboard network is shown in the center column. The operations of a central device for mitigating a manipulation of software 25 are shown all the way on the right.

At a certain instant, a manipulation 410 of the software of first component 27c (or main unit 403) may then occur, as illustrated in FIG. 4. The manipulation is able to be detected by security module 93 of first component 27c. Security module 93 may subsequently orchestrate a reset of the software of the first component. For example, main unit 403 (e.g., the processor) is able to be restarted 405. Alternatively or additionally, security module 93 can switch main unit 403 to a reset mode in which the manipulated software can be reset (e.g., a reprogramming mode). Security module 93 is able to transmit a confirmation 422 that first component 27c was switched to the reset mode to the central device for mitigating a manipulation of software 25.

In some examples, a signal for triggering a reset of the software of first component 27c can be triggered by a signal that is received by security module 93 (e.g., from the central device for mitigating a manipulation of software 25). As an alternative or in addition, security module 93 may use the lack of a signal 411 that is otherwise regularly received at an expected instant (such as from the central device for mitigating a manipulation of software 25) as a trigger for resetting the software of first component 27c.

In addition, the detection of a manipulation is able to be communicated to the central device for mitigating of a manipulation of software 25. In the example of FIG. 4, this happens in that a signal 411, which is otherwise transmitted by first component 27c (on a regular basis), is not transmitted at the expected time. The central device for mitigating a manipulation of software 25 is able to detect 412 the lack of the signal and thus detect (412) the possibility of a manipulation of the software of first component 27c. The central device for mitigating a manipulation of software 25 may subsequently orchestrate a shift of a functionality to the other component 402. For example, a handover instruction of functionality 413 is able to be transmitted to other component 402. The other component can then provide the functionality (and possibly transmit a confirmation 414 to the central device for mitigating a manipulation of software 25).

FIG. 4 shows that the modification of the functionality of first component 27c is terminated in terms of time after the functionality has been shifted to other component 402. In other examples, both actions may be carried out in reverse order or at the same time (e.g., within one second).

The manipulation can now be corrected by resetting the software of first component 27c. In the example of FIG. 4, the central device for mitigating a manipulation of software 25 transmits 416 a software component to main unit 403 for this purpose. In other examples, as described above, security module 93 is able to receive the software component.

In the following sections, aspects of the central device for mitigating of a manipulation of software 25 will be described. In the example of FIG. 2, a central device for mitigating a manipulation of software 25 is shown. In some cases, the vehicle may include only one central device for mitigating a manipulation of software 25, which is designed to mitigate manipulations of the multiplicity of components 21-24, 27a-f (e.g., of all components of a vehicle for which a manipulation of software can be remedied). In other examples, a vehicle may have multiple central devices for mitigating a manipulation of software, which are part of the onboard network and assigned to a multiplicity of the components of the onboard network in each case (that is, are able to correct manipulations in the software of the assigned components). In all cases, however, the central devices for mitigating a manipulation of software are separated from the assigned components. In some cases, the central device for mitigating a manipulation of software 25 can also be configured for a manipulation of its own software and/or of the software of a component into which the central device for mitigating a manipulation of software 25 is integrated.

Figure 2:
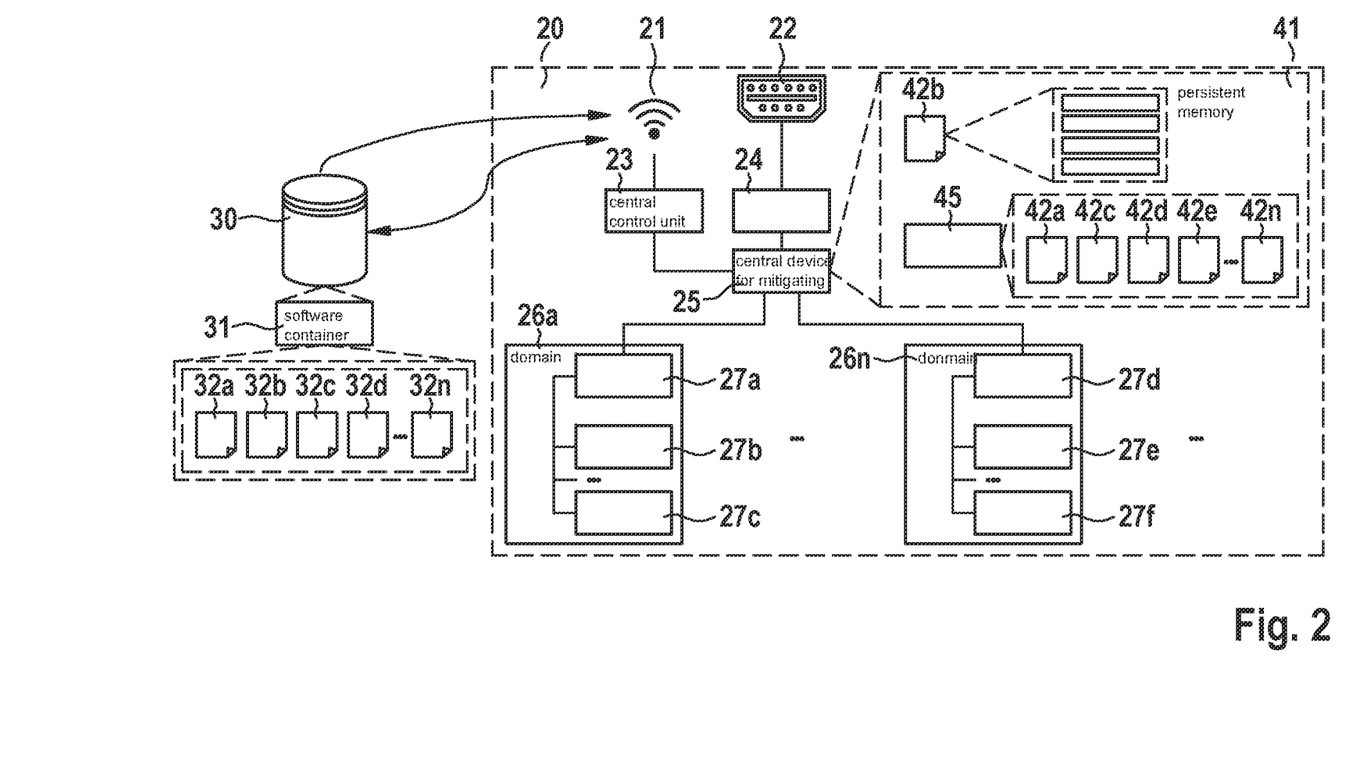
FIG. 2 shows components of an onboard network of a vehicle in which the techniques of an example embodiment of the present invention are able to be used.

In the example of FIG. 2, a multiplicity of components for which manipulations of their software are able to be remedied by the techniques of the present invention include a multiplicity of control devices 27a-f. As described above, the techniques of the present invention are not restricted to control devices but can basically be used for any component of an onboard network of vehicle 20. However, because control devices 27a-f in vehicles usually have only limited hardware resources and/or functionalities, the techniques of the present invention may be especially advantageous for control devices in some cases.

Control devices 27a-f are subdivided into multiple domains 26a-n in FIG. 2. The domains may be functional and/or local domains of vehicle 20. A functional domain may include different components of a vehicle, which take part in providing a specific function of the vehicle (e.g., an engine control, control of the drive train, infotainment, climate control, etc.). A local domain may include different components of a vehicle which are physically situated in a specific region of the vehicle (such as 'right rear', 'left front', 'front interior space', etc.).

A domain 26-n may in turn include a component 27a, 27d, which functions as a central communications node for the respective domain 26a-n, and/or assumes control functions for the respective domain 26a-n. In some examples, a central device for mitigating a manipulation of software may be a part of component 27a, 27d, which functions as a central communications node for the respective domain 26a-n and/or assumes control functions for respective domain 26a-n. This central device for mitigating a manipulation of software may basically be provided in addition to further central devices for mitigating a manipulation of software (e.g., a central device for mitigating a manipulation of software as part of a central communication interface of the onboard network) or be provided as the sole central device for mitigating a manipulation of software (see the explanations in the earlier text). As a further alternative or in addition, a central device for mitigating a manipulation of software is able to be configured as part of a central control unit 23 of the vehicle. As an alternative or in addition, a central device for mitigating a manipulation of software may moreover be provided as part of a main unit ('head unit') of an infotainment system of vehicle 20 (not shown in FIG. 2). Alternatively or additionally, a central device for mitigating a manipulation of software may also be provided as part of a central computer ('vehicle computer') the onboard network (the onboard network may include a multiplicity of central computers—'vehicle computer'). A central computer ('vehicle computer') may provide (considerably higher) performance than dedicated control devices of the onboard network and assume the tasks of multiple control devices (possibly in multiple domains of the aforementioned domains).

In addition, vehicle 20 can include a central persistent memory 41 (that is, a memory which stores its data in the vehicle on a long-term basis, e.g., longer than a day or longer than a week and/or in a quiescent state of the vehicle). In some examples, persistent memory 41 may include a flash memory. In the example of FIG. 2, persistent memory 41 is situated in the central communication interface of vehicle 20 or directly connected to it. As mentioned, the central device for mitigating a manipulation of software 25 may also be accommodated in the central communication interface of vehicle 20. Even if a central device for mitigating a manipulation of software is (additionally or alternatively) situated in another component, a persistent memory may be situated in the same component in addition or as an alternative. In this way, the central device for mitigating a manipulation of software can use data stored in the persistent memory to mitigate manipulations. In other examples, however, a central device for mitigating a manipulation of software and a persistent memory may also be situated in different components of the onboard network (and the central device for mitigating a manipulation of software may access the persistent memory via the network).

Persistent memory 41 is able to be designed for the simultaneous storing of software components 42a, 42c-n for each of the multiplicity of components 27a-f. For this purpose, persistent memory 41 may be designed with a memory capacity of more than 256 MB (preferably more than 5 GB).

As described earlier, the countermeasure against the manipulation includes resetting the software of a component for which a manipulation of its software was detected (also referred to as 'first component' in the present disclosure). This may be done using the software components 42a, 42c-n stored in central persistent memory 41 for the respective component. Further aspects of this countermeasure will be described later in the text in connection with FIG. 5 and FIG. 6.

In some examples, software components 42a, 42c-n, which are included in central persistent memory 41, may be based on software update information 32a, 32c-n for each of the multiplicity of components 27a-n (e.g., can be generated from software update information 32a, 32c-n or correspond thereto).

Software update information 32a, 32c-n is able to be received via an interface 21 of vehicle 20. Interface 21 may be a wireless interface (as shown in FIG. 2) but in other examples may also be a wire-bound interface (not shown in FIG. 2). The vehicle may be developed to receive software update information 32a, 32c-n from a remote system 30 via interface 21. As shown in FIG. 1, remote system 30 is able to select 107 software update information 32a, 32c-n for the corresponding vehicle and transmit 109 it via interface 21 to vehicle 20. Remote system 30 may be any system suitable for providing software update information 32a, 32c-n (such as a cloud memory and/or a distributed system). In addition to providing software update information 32a, 32c-n, remote system 30 is able to assume further functions in the operation of the vehicle (e.g., monitoring and/or control functions for the vehicle).

In some examples, software update information 32a, 32c-n for a multiplicity of components (such as control devices 27a, c-n) is included in a software bundle or software container 31 (in other words, the software update information is provided in bundled form). The software bundle or software container 31 (often having a considerable size) is transmitted to vehicle 20 at a specific point in time. As described, the transmitted software update information 32a, 32c-n is used in vehicle 20 to update the software of the multiplicity of components 27a-f. For this purpose, update information 32a, 32c-n received from remote system 30 may cycle through one or more preparatory step(s) (e.g., unpacking, a signature verification, etc.).

In addition or as an alternative, software update information 32a, 32c-n (e.g., in a software bundle or software container) can also be received via a wire-bound interface 22.

Prior to or following possible preparatory steps, software update information 32a, 32c-n is able to be stored in persistent memory 41 as software components 42a, 42c-n for the multiplicity of components 27a, c-n (e.g., before being used for updating the software of components 27a, c-n). The stored software components 42a, 42c-n for the multiplicity of components 27a, c-n are then available to the central device for mitigating a manipulation of software 25 for the mitigation of a manipulation in the multiplicity of components 27a, c-n. This mitigation may take place after the updating of the software of each one of the multiplicity of components 27a, c-n has been concluded (e.g., during a time period leading up to the receiving of further software update information 32a, 32c-n).

In some examples, the techniques of the present invention are thereby able to utilize components that are already available in the vehicle such as a persistent memory 41, which is used in an updating process of the software of vehicle 20. In some cases, this may provide considerable savings in components (as mentioned earlier, the memory required to store a software bundle or software container 31 of software update information 32a, 32c-n may be quite large). In addition or as an alternative, providing additional resources (e.g., memories) to the individual components is able to be avoided in this way, which can also reduce the complexity and thus the fault susceptibility and/or costs. Moreover, in addition or as an alternative, the information of persistent memory 41 is rapidly available in many situations, independently of the availability of a communications channel of the vehicle. This may increase the reaction time of the mitigation method in the event of a manipulation.

In the techniques of the present invention, the countermeasure for mitigating may be carried out essentially without the use of systems outside vehicle 20 (e.g., remote system 30). For instance, the countermeasure is able to be initiated by the central device for mitigating a manipulation of software 25 without the need to communicate with systems outside vehicle 20 (during this procedure, vehicle 20 can by all means communicate with a system outside vehicle 20 for other purposes). In addition or as an alternative, the central device for mitigating a manipulation of software 25 (or some other component of the onboard network) is able to carry out a countermeasure without requiring any communication with systems outside vehicle 20.

In some examples, the techniques of the present invention may include selecting the countermeasure from among a multiplicity of countermeasures on the basis of context information for the vehicle. The context information can include information pertaining to an operating state of vehicle 20 and/or pertaining to predefined rules for operating vehicle 20.

An operating state may be a driving state of the vehicle (such as fast driving, slow driving, performing certain driving maneuvers, etc.) but may also be an operating state during which the vehicle is not driving. Alternatively or additionally, the context information for vehicle 20 may include environment information and/or state information of the components of the vehicle.

The rules for operating vehicle 20 may include certain predefined security criteria (which in turn may depend on operating states of vehicle 20 and which, for example, stipulate when and based on which dependencies a countermeasure may be initiated for a certain component).

The context information may at least partially be stored in a memory of the central device for mitigating a manipulation of software 25 (e.g., central persistent memory 41) for use in the selection of a countermeasure (in particular the portion of the context information that includes information with regard to predefined rules for operating vehicle 20). In some examples, the context information is able to be updated from outside vehicle 20 (e.g., as part of software update information 32b for the central device for mitigating a manipulation of software 25 or a component in which the central device for mitigating a manipulation of software 25 is accommodated).

In some examples, different countermeasures may be available for mitigating certain manipulations of the software of components 2a, c-n (more details about the possible countermeasures can be found later in the text). The context information may now be utilized to select one of the available countermeasures. On the one hand, it is possible in some examples to select the particular countermeasure from among multiple available countermeasures that allows for the most extensive restoring of a setpoint state of the component (in other words, remedies the manipulation to the greatest extent). On the other hand, available countermeasures may be excluded in some situations on account of rules included by the context information (for instance if a specific security criterion were to be violated).

For example, a first countermeasure may actually allow for a more extensive mitigation of the manipulation than a second countermeasure, but it may cause a more far-reaching intervention in the component of the vehicle (and thus pose a greater risk of interruptions that may be the result of the mitigation process itself). In comparison with the first countermeasure, a second countermeasure may allow for a less extensive mitigation of the manipulation, but it may also produce a less radical intervention in the components of the vehicle. In this case, the first countermeasure may be selected in a first context (expressed by the context information), and the second countermeasure be selected in a second context (expressed by the context information). In an illustrative example, the first context may be a context in which the vehicle is driving fast, and the second context can be a context in which the vehicle is at a standstill. In other cases, the context information may include a security criterion whose compliance prohibits the implementation of the first countermeasure in a first situation but permits it in a second situation.

In some examples, the countermeasures may include an immediate reset (e.g., within five minutes or within one minute) of the software of first component 27a, c-f with the aid of software component 42a, c-n stored in central persistent memory 41 (e.g., generated based on the received software update information) for component 27a, c-f for which a manipulation was detected, and a later reset of the software of component 27a, c-f with the aid of software components 42a, c-n for the respective component 27a, c-f. Once again, the immediate resetting may be excluded in certain contexts (e.g., by security criteria). For instance, the later resetting may take place during a time period leading up to the next startup process of the respective component 27a, c-f.

Figure 5:
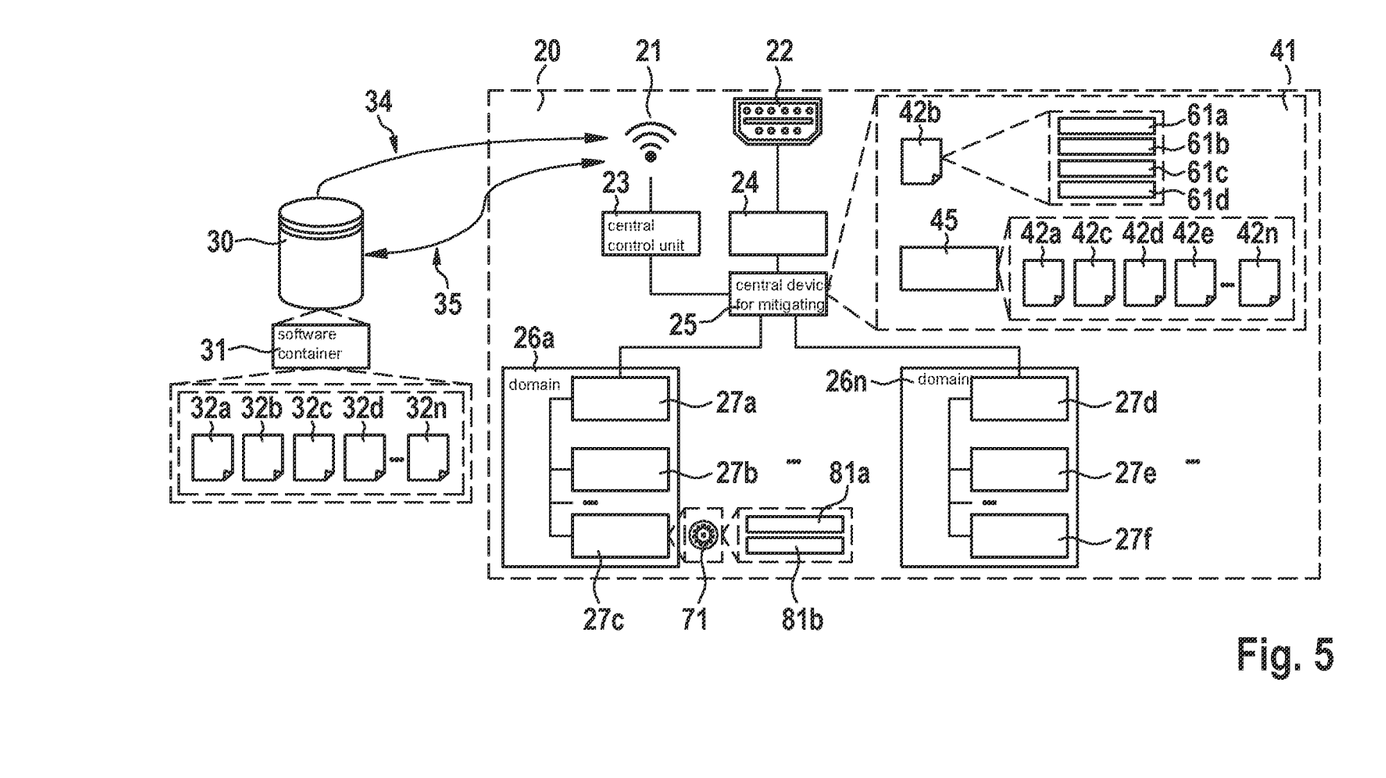
FIG. 5 shows the onboard network according to FIG. 2, in which a first component was manipulated.
Figure 6:
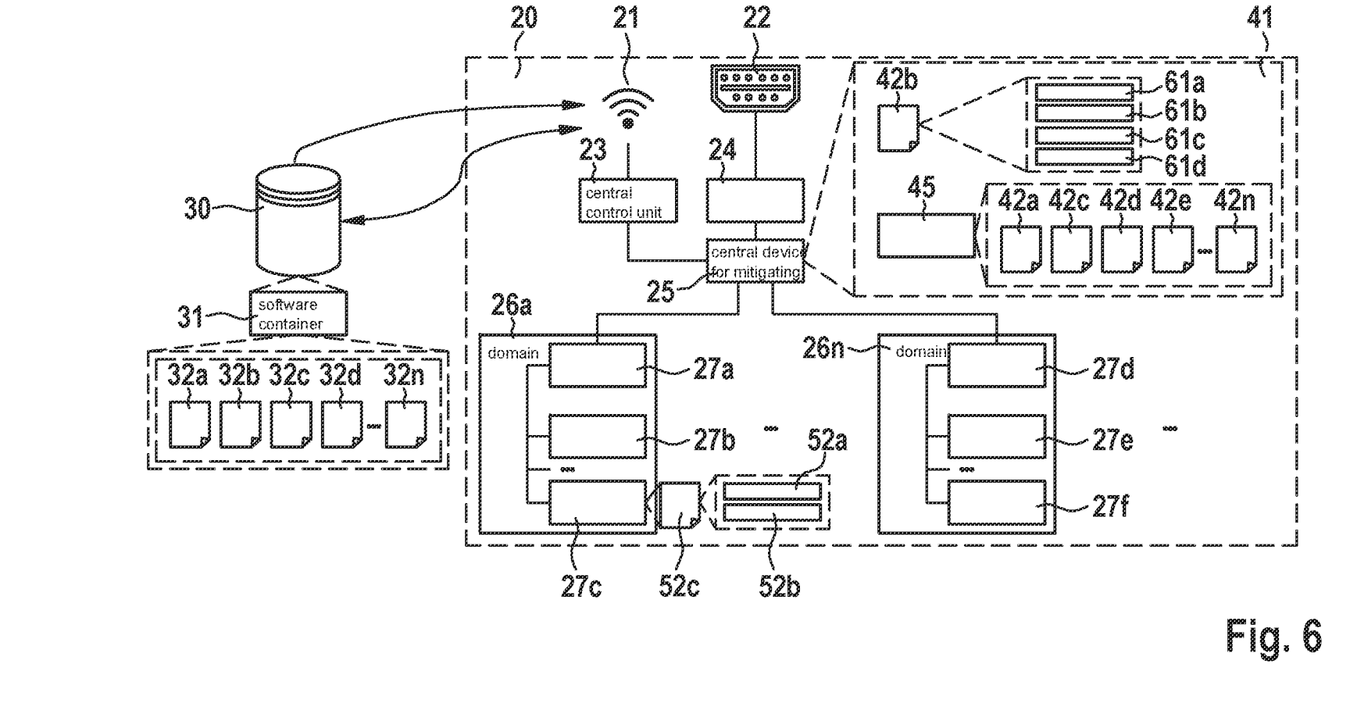
FIG. 6 shows the onboard network according to FIG. 2, in which the manipulation of the first component was corrected.

In the following text, further aspects of the techniques of the present invention will be described on the basis of FIG. 5 and FIG. 6. FIG. 5 shows onboard network according to FIG. 2, in which a first component 27c was manipulated. FIG. 6 shows the onboard network according to FIG. 2, in which the manipulation of first component 27c was repaired.

To begin with, a few aspects of the detection of the manipulation of the software of a component 27a, c-f of vehicle 20 will be described in greater detail. As mentioned earlier, the techniques of the present invention include the detection of a possibility of a manipulation of the software of a component of a multiplicity of components of an onboard network, which includes receiving a signal in some examples. This signal is able to be generated in different ways.

First, a manipulation of a software of a component 27a, c-f may be detected. This detection can take place locally by corresponding (manipulation) detection devices of the individual component.

In FIG. 5, the software of one of control devices 27c (the 'first component' in some examples of the present invention) has been manipulated. A manipulated software component 71 was introduced.

A (manipulation) detection device 81a of control device 27c (e.g., a part of a security module) is able to detect this manipulation and generate a corresponding signal for the central device for mitigating a manipulation of software 25 (see also steps 111 and 113 in FIG. 1). This signal can then be processed as described above to initiate a mitigation.

Figure 3:
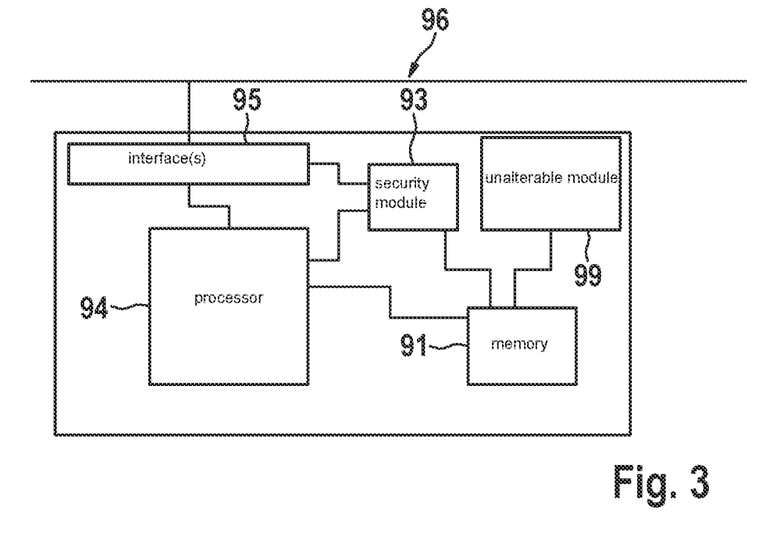
FIG. 3 shows an exemplary component of an onboard network.

In other examples or in addition, a (manipulation) detection device 61b of the central communication interface of vehicle 20 may detect the manipulation of control device 27c (from the distance) and generate the signal for the central device for mitigating a manipulation of software 25 (which is also situated in the central communication interface of vehicle 20 in the example of FIG. 3). In some examples, the central device for mitigating a manipulation of software 25 is therefore also designed for a central detection of the manipulation of the software of a multiplicity of components 27a, c-f of the onboard network.

In other examples or in addition, a detection device of remote system 30 is able to detect the manipulation of control device 27c (from the distance) and generate the signal for the central device for mitigating a manipulation of software 25. In this example, the signal is able to be received via an interface of the vehicle. However, if the detection of the manipulation also takes place inside the vehicle, a time period until the mitigation of the manipulation takes place may be shortened in some cases.

The different detection devices 81a, 61b (especially detection devices 81a, 61b situated within the vehicle) may be detection devices that already exist in the (onboard) network. As described earlier, manipulations of the software can also be identified in some conventional methods.

The detection of the manipulation is able to be implemented in any possible manner. For example, a software can be checked during the startup ('secure boot') and/or during the operation ('runtime manipulation detection') with the aid of one or multiple method(s) for checking the authenticity and/or genuineness of the software (for instance using one or more digital signature(s)).

In other examples, a signal whose absence results in the detection of a manipulation possibility can be generated by the components described herein. For instance, a (manipulation) detection device 81a of control device 27c is able to generate a signal (e.g., on a regular basis or in response to the occurrence of specific events), whose non-arrival may indicate a manipulation of the software of control device 27c.

With reference to FIG. 5 and FIG. 6, additional aspects of the countermeasure of resetting the software of first component 27c with the aid of a software component 42c stored in central persistent memory 41 for first component 27c are described.

The central device for mitigating a manipulation 25 is able to select a countermeasure based on the detection of the manipulation of first component 27c. In the example of FIGS. 5 and FIG. 6, a reset of the software of first component 27c is described. The reset may include returning the software to the latest authenticated state. This may include the deletion and/or overwriting of parts of or the complete software of first component 27c (e.g., a control device). The deletion and/or overwriting of parts of or of the complete software of first component 27c is/are able to be carried out from the distance (that is, via a connection of the onboard network) by the central device for mitigating a manipulation 25. In this way, it is possible to replace manipulated software component 71 or parts thereof 81a, 81b with an authentic (that is, non-manipulated) software component 52c, or parts thereof 53a, 53b so that the manipulation can be remedied.

The authentic (i.e., non-manipulated) software 52c is able to be called up from persistent memory 41. As mentioned above, persistent memory 41 can store software component 42 in a directly usable form, or in a form that is able to be used for resetting the manipulated software component 71 of first component 27c only after one or more processing steps.

In some examples, the central device for mitigating a manipulation 25 may carry out measures to ensure the authenticity of software components 42a, c-n used for resetting the software of the components. For instance, prior to using a software component 42a, c-n, an authenticity check can be carried out (e.g., based on a digital signature or some other security feature). For the authenticity check, the central device for mitigating a manipulation may utilize functionalities of the component into which the central device for mitigating a manipulation 25 is integrated.

In some examples, persistent memory 41 may include more than one version of a software component for a specific component of the onboard network. In this case, the central device for mitigating a manipulation 25 is able to select one of the versions (such as a current version of the software component).

In the above section, a countermeasure for mitigating the manipulation of a first component 27c of the onboard network was discussed with reference to FIG. 5 and FIG. 6. However, the central device for mitigating a manipulation 25 is designed to initiate countermeasures with regard to the manipulation of the software of one or more further component(s) of the multiplicity of components 27a, d-f at a different time or simultaneously with the mitigation of the manipulation of the software of first component 27c.

In some examples, the central device for mitigating a manipulation 25 is designed to detect the possibility of a manipulation of the software of a further component 27a, d-f of the multiplicity of components of the onboard network and to initiate a further countermeasure for mitigating the manipulation of further component 27a, d-f. The detection of the manipulation, the initiation and execution of the countermeasures is able to be carried out in the aforedescribed manner. For example, a manipulated software component of further component 27a, d-f may be reset.

In this way, a single central device for mitigating a manipulation is able to supply a multiplicity of components that are located at a distance in the onboard network (such as control devices in different domains) (or in other words, remedy manipulations of software of the multiplicity of components).

In the above sections, the resetting of a software of a component was described as a countermeasure that is initiated by the central device for mitigating a manipulation and carried out in the onboard network.

In some examples, the central device for mitigating a manipulation is additionally able to initiate further countermeasures, which are then carried out.

In some examples, the further countermeasure against the manipulation may include blocking a communication via the onboard network of first component 27c (whose software is manipulated). Blocking the communication may prevent damage caused by a manipulated software of first component 27c via the onboard network. On the other hand, a manipulated software is still able to perform a function of first component 27c (e.g., for a certain period of time). For this reason, blocking the communication via the onboard network of first component 27c may be preferrable to a reset of the software of first component 27c in some cases (for instance in a context in which a nonavailability of first component 27c is not tolerable or desirable, at least in the short term). The countermeasure of resetting the software of first component 27c may be initiated and carried out following the countermeasure of blocking the communication of first component 27c (e.g., in a changed context).

As an alternative or in addition, the further countermeasure against the manipulation may include blocking a communication via the onboard network of a group of components that includes first component 27c. In the example of FIG. 3, first component 27c may be included in a first domain 26a with further components 27a, b. The blocking of the communication of a group of components via the onboard network is similar to blocking the individual component, as described above. Here, too, damage to the onboard network caused by the group of components can be prevented. In the case of blocking the communication of a group of components via the onboard network, the countermeasure of resetting the software of first component 27c is also able to be initiated and carried out at a later time (such as in a changed context).

As an alternative or in addition, the further countermeasure against the manipulation moreover may include changing a functionality of first component 27c for which a manipulation was detected. For instance, a functionality can be restricted according to a predetermined pattern (such as to a functionality that is needed for certain safety-relevant aspects in a respective context).

As another alternative or in addition, the further countermeasure against the manipulation may include shifting a functionality of first component 27c for which a manipulation was detected to one other component or to multiple other components of the multiplicity of components 27a, b, d-f. For instance, the one or more other component(s) of the multiplicity of components 27a, b, d-f may assume a task (or parts thereof) of the first component 27c at least intermittently. First component 27c can then be deactivated and/or blocked. In this case, too, it is possible to initiate and carry out the countermeasure of resetting the software of first component 27c at a later point in time (e.g., in a changed context).

In the above sections, the techniques of the present invention were often described with the aid of the respective methods. The present invention also relates to a system which is designed to execute the methods of the present invention. The system may include one or more component(s) of the onboard network of the vehicle (e.g., be integrated therein). The onboard network may also include devices that are included in the onboard network only intermittently (e.g., a mobile device situated in the vehicle and integrated into the onboard network). The system may also include a remote system in other examples.

However, the present invention also relates to an onboard network for a vehicle which includes at least one central device for mitigating a manipulation of software according to the present invention and a multiplicity of components of the onboard network. The onboard network may be designed to execute the methods of the present invention. The onboard network may also encompass devices that are included in the onboard network only intermittently (such as a mobile device which is situated in the vehicle and integrated into the onboard network).

As described above, the central device for mitigating a manipulation of software can be a stand-alone device (that is, a dedicated module having its own hardware and software resources, which is part of the onboard network and is able to communicate with the other components of the onboard network). In other cases, however, the central device for mitigating a manipulation of software will be integrated into another (already existing) component of the onboard network. The central device for mitigating a manipulation of software is able to be developed as a software module (which is inserted into the software of the component). In other cases, the central device for mitigating a manipulation of software may have at least a few dedicated hardware components (while also using other hardware components of the component into which it is integrated). As also mentioned, the other component may be a central communication interface of the onboard network, a central computer ('vehicle computer') or some other component having relatively high-performance hardware.

In some examples, an existing component of the onboard network (e.g., a central communication interface of the vehicle or a domain of the vehicle, or a central computer of the vehicle or a head unit of an infotainment system) is able to be set up as a central device for mitigating a manipulation of software by updating the software of the component of the onboard network.

The central device for mitigating a manipulation of software, or the other component in which it is integrated, may include at least one processor (possibly having multiple cores) and a memory which has instructions that execute the method of the present invention when the instructions are executed by the processor.

In addition, the present invention also pertains to a vehicle which includes a system according to the present invention or is a part thereof, and/or which includes an onboard system according to the present invention.

Moreover, the present invention pertains to a computer program which is designed to execute the methods of the present invention.

In addition, the present invention relates to a computer-readable medium (such as a DVD or a non-volatile memory), which includes a computer program according to the present invention.

The present invention also relates to a signal (such as an electromagnetic signal according to a wireless or wire-bound communication protocol), which encodes a computer program of the present invention.

What is claimed is:

1. A computer-implemented method, comprising:
    detecting a possibility of a manipulation of software of a first component of a multiplicity of components of an onboard network of a vehicle in a central device configured to mitigate a manipulation of software, the central device configured to mitigate a manipulation being part of the onboard network and configured for the mitigation of software in each of the multiplicity of components of the onboard network;
    initiating a countermeasure for mitigating the manipulation of the software of the first component by the central device configured to mitigate a manipulation; and
    implementing the countermeasure for mitigating the manipulation of the software of the first component, the countermeasure against the manipulation including resetting the software of the first component using a security module of the first component and/or an unalterable module of the first component,
    wherein the initiating includes refraining by the central device from sending a message, wherein the message is regularly sent by the central device when no possibility of the manipulation is detected.

2. The method as recited in claim 1, wherein the resetting of the software of the first component includes:
switching the first component to a reset mode by the security module of the first component and/or the unalterable module of the first component.

3. The method as recited in claim 2, wherein the resetting of the software of the first component further includes:
restarting a processor of the first component prior to switching the first component to the reset mode;
receiving a software component for resetting the software after the first component has been switched to a reset mode; and
storing the received software component in a memory of the first component.

4. The method as recited in claim 3, wherein the restarting of the processor of the first component is initiated by the security module.

5. The method as recited in claim 3, wherein the restarting of the processor of the first component is initiated by a current-supply unit of the vehicle, which is configured to selectively supply the multiplicity of components of the onboard network with energy.

6. The method as recited in claim 3, wherein the restarting of the processor of the first component is initiated by an actuation of a central activation function of the vehicle.

7. The method as recited in claim 1, wherein the unalterable module of the first component is a boot loader.

8. The method as recited in claim 1, wherein a software component for resetting the software is transmitted by the central device configured to mitigate a manipulation.

9. The method as recited in claim 3, wherein the receiving of the software component for resetting the software and storing of the received software component are carried out by the security module.

10. The method as recited in claim 3, wherein the receiving of the software component for resetting the software and storing the received software component are carried out by the unalterable module.

11. A system, comprising:
an onboard network configured to:
detect a possibility of a manipulation of software of a first component of a multiplicity of components of the onboard network of a vehicle in a central device configured to mitigate a manipulation of software, the central device configured to mitigate a manipulation being part of the onboard network and configured for the mitigation of software in each of the multiplicity of components of the onboard network;
initiate a countermeasure for mitigating the manipulation of the software of the first component by the central device configured to mitigate a manipulation; and
implement the countermeasure for mitigating the manipulation of the software of the first component, the countermeasure against the manipulation including resetting the software of the first component using a security module of the first component and/or an unalterable module of the first component,
wherein the countermeasure is initiated by causing the central device to refrain from sending a message, wherein the message is regularly sent by the central device when no possibility of the manipulation is detected.

12. An onboard network for a vehicle, including:
a central device including a processor configured to mitigate a manipulation of software;
a multiplicity of components of the onboard network, which includes a first component;
wherein the onboard network is configured to:
detect a possibility of a manipulation of software of the first component of the multiplicity of components of an onboard network of a vehicle in the central device configured to mitigate a manipulation of software, the central device configured to mitigate a manipulation being part of the onboard network and configured for the mitigation of software in each of the multiplicity of components of the onboard network;
initiate a countermeasure for mitigating the manipulation of the software of the first component by the central device configured to mitigate a manipulation; and
implement the countermeasure for mitigating the manipulation of the software of the first component, the countermeasure against the manipulation including resetting the software of the first component using a security module of the first component and/or an unalterable module of the first component,
wherein the countermeasure is initiated by causing the central device to refrain from sending a message, wherein the message is regularly sent by the central device when no possibility of the manipulation is detected.

13. A vehicle, comprising:
an onboard network configured to:
detect a possibility of a manipulation of software of a first component of a multiplicity of components of the onboard network of the vehicle in a central device configured to mitigate a manipulation of software, the central device configured to mitigate a manipulation being part of the onboard network and configured for the mitigation of software in each of the multiplicity of components of the onboard network;
initiate a countermeasure for mitigating the manipulation of the software of the first component by the central device configured to mitigate a manipulation; and
implement the countermeasure for mitigating the manipulation of the software of the first component, the countermeasure against the manipulation including resetting the software of the first component using a security module of the first component and/or an unalterable module of the first component,
wherein the countermeasure is initiated by causing the central device to refrain from sending a message, wherein the message is regularly sent by the central device when no possibility of the manipulation is detected.

14. A non-transitory computer-readable medium on which is stored a computer program, the computer program, when executed by a computer, causing the computer to perform the following steps:
detecting a possibility of a manipulation of software of a first component of a multiplicity of components of an onboard network of a vehicle in a central device configured to mitigate a manipulation of software, the central device configured to mitigate a manipulation being part of the onboard network and configured for the mitigation of software in each of the multiplicity of components of the onboard network;

initiating a countermeasure for mitigating the manipulation of the software of the first component by the central device configured to mitigate a manipulation; and implementing the countermeasure for mitigating the manipulation of the software of the first component, the countermeasure against the manipulation including resetting the software of the first component using a security module of the first component and/or an unalterable module of the first component, wherein the initiating includes refraining by the central device from sending a message, wherein the message is regularly sent by the central device when no possibility of the manipulation is detected.

* * * * *